United States Patent

Murau et al.

[11] Patent Number: 5,220,973
[45] Date of Patent: Jun. 22, 1993

[54] HOLDING DEVICE FOR A COOLER

[75] Inventors: Heinz Murau; Hans-Uwe Baumann, both of Stuttgart, Fed. Rep. of Germany

[73] Assignee: Dr. Ing. h.c.F. Porsche A.G., Fed. Rep. of Germany

[21] Appl. No.: 787,922

[22] Filed: Nov. 7, 1991

[30] Foreign Application Priority Data

Nov. 7, 1990 [DE] Fed. Rep. of Germany ....... 4035347

[51] Int. Cl.⁵ .............................................. B60K 11/04
[52] U.S. Cl. ..................... 180/68.4; 165/67; 165/134.1; 248/213.3; 248/232; 248/900
[58] Field of Search ................... 248/900, 202.1, 213.3, 248/213.4, 232, 233, 234; 165/67, 134.1; 293/115; 296/180.1; 180/68.6, 68.4

[56] References Cited

U.S. PATENT DOCUMENTS

| | | | |
|---|---|---|---|
| 2,912,057 | 11/1959 | Wagner | 180/68.4 |
| 3,334,704 | 8/1967 | Gehrke et al. | 180/68 |
| 4,453,728 | 6/1984 | Verge | 280/851 |
| 4,641,721 | 2/1987 | Yamaguchi | 180/68.4 X |
| 4,840,475 | 6/1989 | Herzog et al. | 248/900 X |
| 5,067,574 | 11/1991 | Attinger et al. | 180/68.4 |

FOREIGN PATENT DOCUMENTS

| | | |
|---|---|---|
| 3446752 | 7/1986 | Fed. Rep. of Germany . |
| 8634544 | 4/1987 | Fed. Rep. of Germany . |
| 8105299 | 9/1981 | France . |
| 212092 | 1/1941 | Switzerland . |

Primary Examiner—Margaret A. Focarino
Assistant Examiner—Michael Mar
Attorney, Agent, or Firm—Evenson, McKeown, Edwards & Lenahan

[57] ABSTRACT

A holding device for a cooler, particularly an oil cooler of a motor vehicle which is arranged adjacent to a front-side covering part of the bumper and, by way of bearings arranged on both sides of the cooler, can be moved about a transverse swivel shaft against the driving direction of the vehicle. In order to maintain the cooler in an undamaged and operative condition in the case of an impact of the covering or of the bumper, the cooler is held in its original position by springs and can swivel into an evading position in the case of an impact against the force of these springs.

11 Claims, 3 Drawing Sheets

HOLDING DEVICE FOR A COOLER

BACKGROUND AND SUMMARY OF THE INVENTION

The present invention relates to a holding device for a cooler, more particularly, to a motor vehicle oil cooler holding device arranged adjacent to a front-side covering part of the bumper and movable about a transverse swivel shaft by bearings arranged on both sides of the cooler.

For flow-through reasons, coolers for motor vehicles are mounted closely behind covering parts of the vehicle body so that the cooler is affected, even in the case of slight deformations of these covering parts, as may occur, for example, during a collision. Because of the elasticity of the covering parts, it is possible that, under certain circumstances, these covering parts may spring back into their original position without any permanent deformations as a result of their elastic characteristics. In the case of oil coolers which, as a rule, are mounted underneath the bumper and are therefore frequently subjected to slight contacts with curbstones and the like, it is therefore possible that they may be damaged.

German Patent DE-A 34 46 752 shows a holding device for an oil cooler of a motor vehicle which is disposed to be swivelled about a shaft which is arranged transversely with respect to the driving direction and, in the lower area, is held so as to be fixed to the vehicle by a rubber bracket. It is a disadvantage in this arrangement that several fastening points fixed to the vehicle are required for this holding device. In addition, the rubber bracket does not immediately release the cooler in the case of a collision or the like but tears only starting from a certain force on the cooler which, among other things, depends on the temperature and the aging condition of the rubber, and must therefore be replaced.

It is an object of the present invention to provide a holding device which ensures that, in the case of an impact of the covering or of the bumper, the cooler remains undamaged and operative.

This object has been achieved in accordance with the present invention by clamping the cooler between two consoles which each have bearings 10 forming the swivel shaft. On one side, by way of at least one tension spring, can be fixed at stops formed by stationary bearing angles in an original position, and, on the other side, can be adjusted into an evading position which can be swivelled back elastically against the driving direction.

The holding device, according to an advantageous feature of the invention, is connected with the vehicle only by way of a swivel shaft formed by two bearings. Thus, apart from the two fastening points of the swivel shaft, no further fastening point is required and the constructional expenditures needed are therefore reduced. The cooler is form-fittingly disposed in the consoles, and these consoles are held in their operative position by springs. As a result, the mounting expenditures are reduced (e.g., larger tolerances and no alignment), and the number of connecting points is also reduced which may become unintentionally detached, because of, for example, vibrations. In the case of an impact, the cooler is elastically and uniformly deflected against the spring force. As a result, damage to the cooler because of force peaks, which occur, for example, when a rubber brackets tears, are avoided.

BRIEF DESCRIPTION OF THE DRAWINGS

Other objects, advantages and novel features of the present invention will become more apparent from the following detailed description of a currently preferred embodiment when taken in conjunction with the accompanying drawings wherein.

DETAILED DESCRIPTION OF THE DRAWINGS

Figure 1:
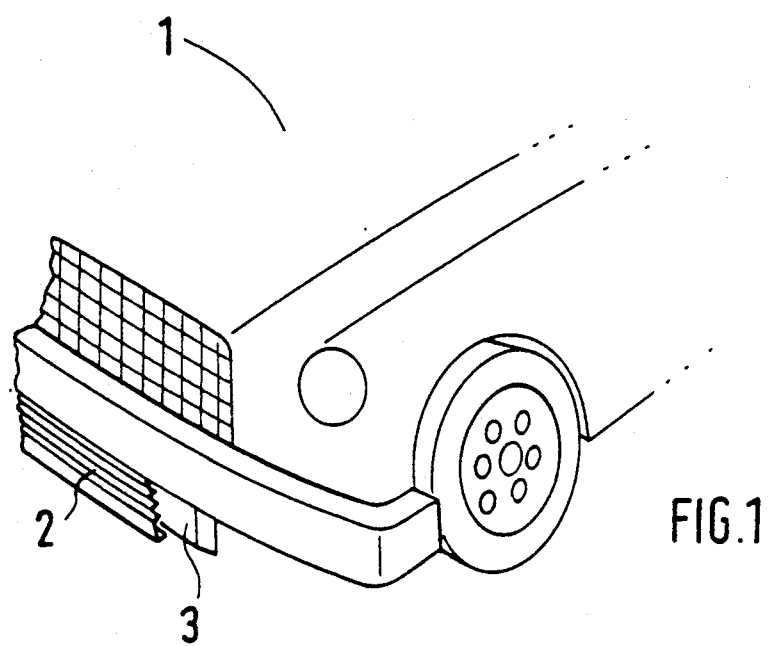
FIG. 1 is a partial frontal perspective view of a motor vehicle.
Figure 2:
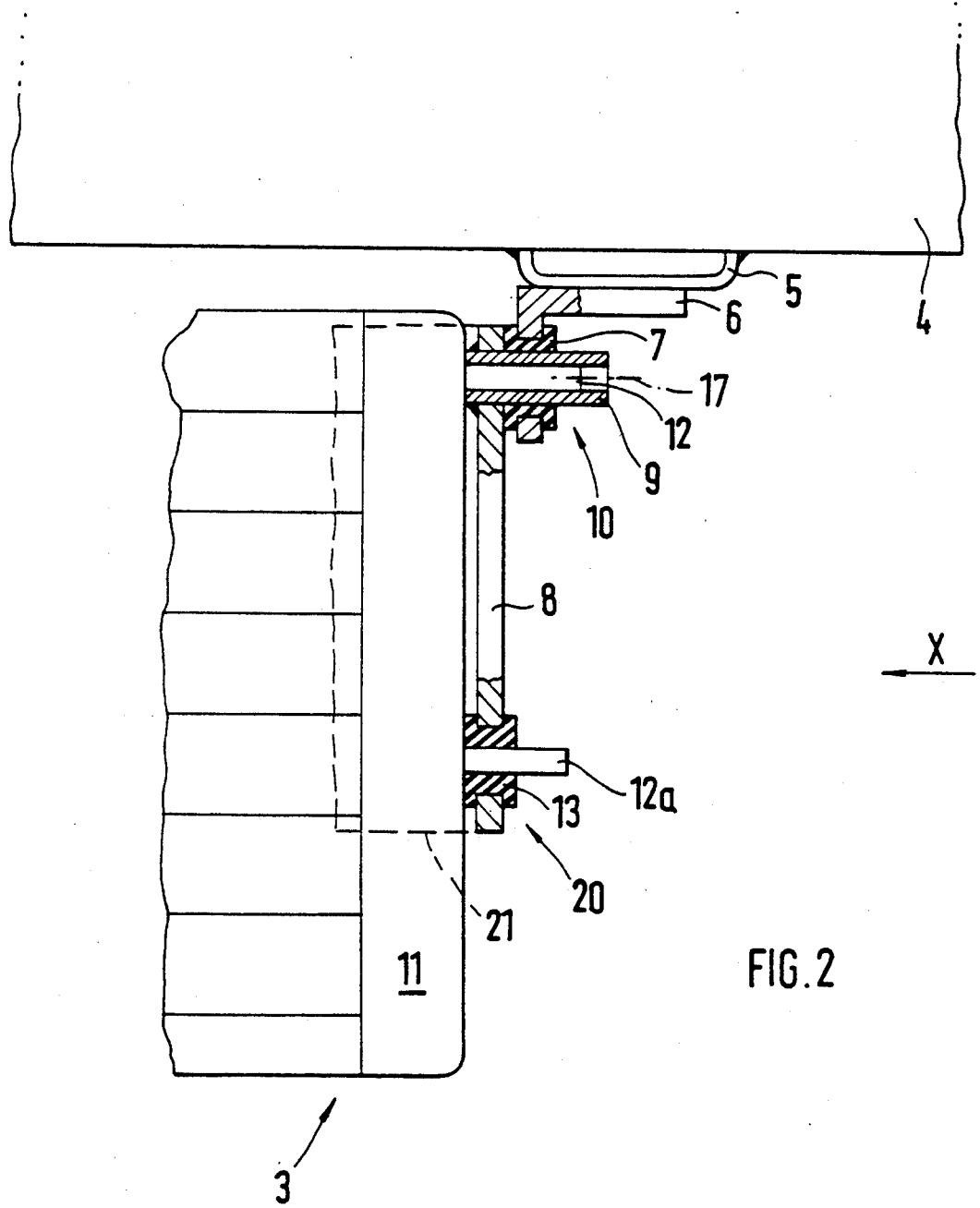
FIG. 2 is a partial sectional front view of the holding device according to the present invention.
Figure 3:
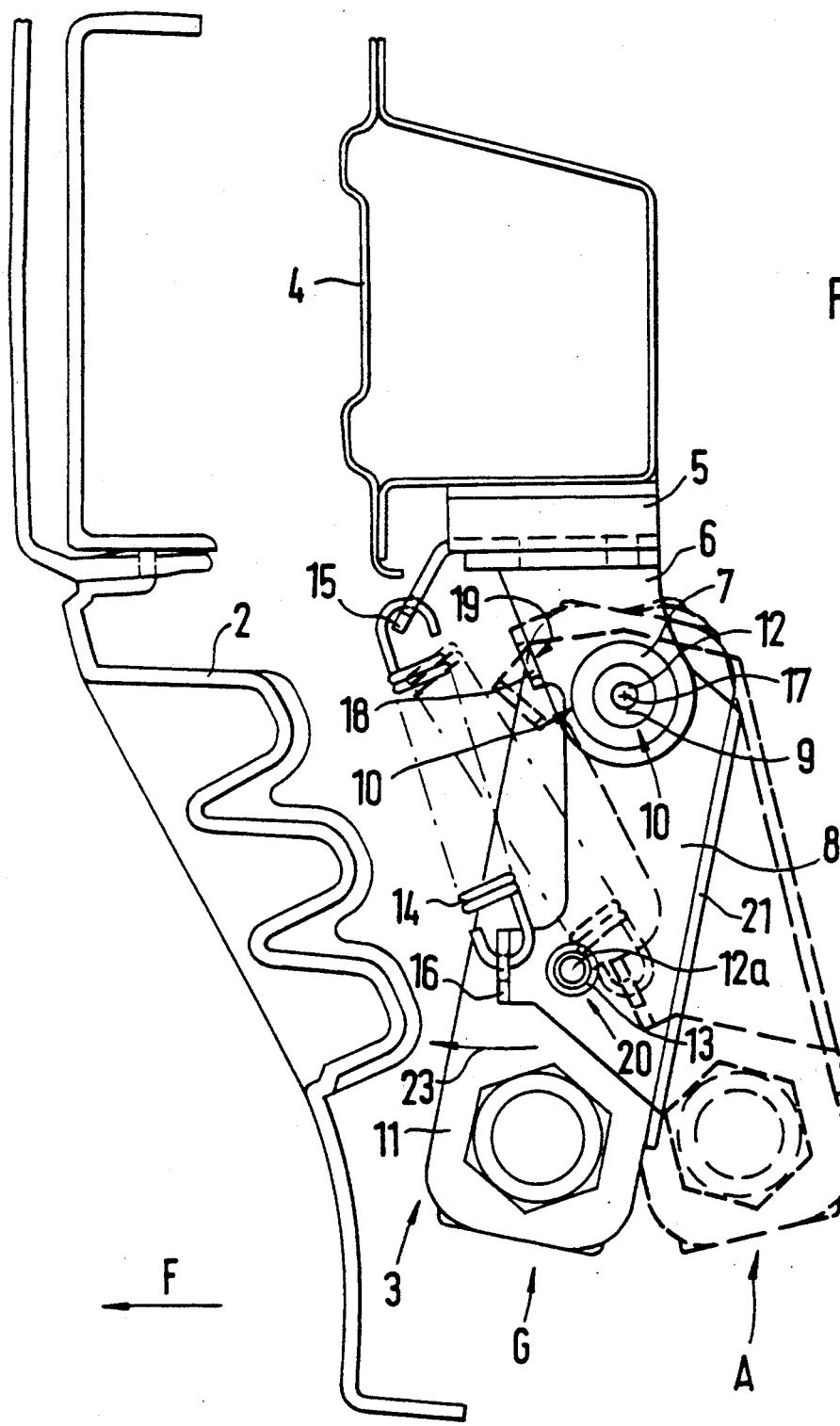
FIG. 3 is a view taken along arrow X of FIG. 2.

FIG. 1 illustrates a conventional motor vehicle 1 which comprises an elastic covering part 2 behind which an oil cooler 3 is fastened. FIG. 2 shows a lower cross member 4 on one side of the motor vehicle 1 shown in FIG. 1 with a bearing bracket 5 which is fastened to it and to which an upper lege of an L-shaped bearing angle 6 is screwed. In the lower leg of the bearing angle 6, a rubber bush 7 is disposed in a circular recess and receives in its bore a cylindrical pipe section 9 which is welded together with a console 8. The rubber bush 7 and the pipe piece 8 together form a swivel bearing designated generally by the numeral 10 whose longitudinal shaft or axis 17 extends in parallel to the cross member 4 transversely of the vehicle as best shown in FIG. 3. The console 8 is formed by an L-shaped sheet metal profile. A first leg of the profile extends in parallel to the bearing angle 6, and a second leg 21 of the profile is bent at an angle with respect to the first leg and supports the cooler 3 on its rear. It will be understood that an identical console is arranged on the other side of the vehicle 1.

The holding device for the oil cooler 3 comprises essentially the two consoles 8 which are arranged between the bearing angles 6, the legs 21 of the consoles 8 being directed against one another. On its two longitudinal sides, a cooler housing 11 has two pins 12, 12a, respectively, which are disposed above one another and by means of which the cooler housing 11 is hung into the consoles 8. A first pin 12 is received by a bore of a cylindrical pipe piece 9, and the second pin 12a is received by a rubber bush 13 which is disposed in a bore of the console 8.

In the side view of FIG. 3, a spring 14 is, on one side, linked to a projecting bracket 15 of the bearing bracket 5, and on the other side, is linked to a bracket 16 of the console 8. This bracket 16 is a component of the console 8 and is bent at a right angle toward the outside with respect to the bent leg 21.

The spring 14 is prestressed and swivels the cooler 3 in the driving direction shown by arrow F about the swivel shaft 17 formed by the bearings 10. By way of a bracket 18 on the first leg of the console 8, the rotating movement in the direction of the arrow 23, which is triggered by the spring 14, is supported on a stop 19 of the bearing angle 6.

A known flexible connection of the cooler housing 11 with the engine by way of two connecting lines is not shown for clarity. The spring 14 is preferably constructed as a spiral tension spring. Other elastic elements may, however, also be used without departing from the scope of the present invention. Pressure elements may also be used if they are mounted on the side opposite the stop 19 between the console 8 and the bearing bracket 5.

In the original position G shown by solid lines, the springs 14 swivel the consoles 8 together with the cooler 3 about the swivel shaft 17 in the driving direction F against the stops 19 and hold the consoles 8 there by way of the prestressing force of the springs 14.

In the case of an impact of the elastic covering part 2 on a stationary object, the elastic covering part is deformed. If the deformation has become so extensive that the elastic covering part 2 comes in contact with the oil cooler 3, the oil cooler is swivelled against the prestressing of the spring 14, from the original position G into the deforming direction unto an evading position A shown in dashed lines in FIG. 3. The force, which is required for this purpose, first corresponds to the prestressing force of the spring 14 and will then increase continuously as the deflection increases. After the impact, the elastic covering part 2 swivels back into its original position. At the same time, the spring 14 swivels the oil cooler 3 back into its original position G. When the deformation of the covering part 2 is so large that a permanent deformation occurs, the cooler 3 will remain in the evading position A and can be swivelled back into its original position after the deformed elastic covering part 2 has been exchanged.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A holding device for a cooler of a motor vehicle, arranged adjacent to a front-side covering part of a bumper of the motor vehicle and moveable about a transverse swivel shaft by bearings arranged on each side of an upper end of the cooler, wherein the cooler is operatively clamped between consoles which each have the bearings for receiving the transverse swivel shaft and, via at least one tension spring, the cooler can be fixed in a forward undeflected position with respect to a driving direction of the vehicle, at stops formed by stationary bearing angles and the cooler can also be swivellably moved about the transverse swivel shaft and against the force of the spring into a rearward deflected evading position.

2. The holding device according to claim 1, wherein the stop on the bearing angle engages with a bent-away bracket of the console in the undeflected position.

3. The holding device according to claim 1, wherein the bearing, forming the swivel shaft for the cooler is configured between the bearing angle and the console by a cylindrical pipe piece connected with the console and movably held by a rubber bush inserted at the bearing angle.

4. The holding device according to claim 1, wherein the cooler is held in the bearing forming the swivel shaft by a first pin and is held in a fixed bearing of the console by a second pin, the pins being arranged opposite one another on longitudinal sides of the cooler, and the cooler is form-fittingly held on bent-away legs of the consoles.

5. The holding device according to claim 4, wherein, a bearing bracket with a projecting bracket is operatively arranged, between a cross member and the bearing angle, and the tension spring, on one side, is connected under prestress with the projecting bracket, and, on the other side, is connected with the console.

6. The holding device according to claim 5, wherein the stop on the bearing angle engages with a bent-away bracket of the console in the undeflected position.

7. The holding device according to claim 6, wherein the bearing, forming the swivel shaft for the cooler is configured between the bearing angle and the console by a cylindrical pipe piece connected with the console and movably held by a rubber bush inserted at the bearing angle.

8. A holding device for a cooler of a motor vehicle, arranged adjacent to a front-side covering part of a bumper of the motor vehicle and moveable about a transverse swivel shaft by bearings arranged on each side of an upper end of the cooler, wherein the cooler is operatively clamped between consoles which each have the bearings for receiving the transverse swivel shaft and, via at least one tension spring the cover can be fixed in a forward undeflected position with respect to a driving direction of the vehicle, at stops formed by stationary bearing angles and the cooler can also be swivellably moved about the transverse swivel shaft and against the force of the spring into a rearward deflected evading position, wherein, a bearing bracket with a projecting bracket is operatively arranged, between a cross member and the bearing angle, and the tension spring, on one side, is connected under prestress with the projecting bracket, and, on the other side, is connected with the console.

9. The holding device according to claim 8, wherein the stop on the bearing angle engages with a bent-away bracket of the console in the undeflected position.

10. A holding device for a cooler of a motor vehicle, arranged adjacent to a front-side covering part of a bumper of the motor vehicle and moveable about a transverse swivel shaft by bearings arranged on each side of an upper end of the cooler, wherein the cooler is operatively clamped between consoles which each have the bearings for receiving the transverse swivel shaft and, via at least one tension spring the cooler, can be fixed in a forward undeflected position with respect to a driving direction of the vehicle, at stops formed by stationary bearing angles and the cooler can also be swivellably moved about the transverse swivel shaft and against the force of the spring into deflected evading position, wherein the bearing, forming the swivel shaft for the cooler is configured between the bearing angle and the console by a cylindrical pipe piece connected with the console and movably held by a rubber bush inserted at the bearing angle, and a bearing bracket with a projecting bracket is operatively arranged, between a cross member and the bearing angle, and the tension spring, on one side, is connected under prestress with the projecting bracket, and, on the other side, is connected with the console.

11. The holding device according to claim 10, wherein the stop on the bearing angle engages with a bent-away bracket of the console in the original position.

* * * * *